(12) United States Patent
Lyon et al.

(10) Patent No.: US 6,798,586 B1
(45) Date of Patent: Sep. 28, 2004

(54) CORRECTOR OPTIC COMPENSATING SPHERICAL AND COMA ABERRATIONS GENERATED BY A PRISM

(75) Inventors: Richard F. Lyon, Los Altos, CA (US); Mark E. McDonald, Milpitas, CA (US); Timothy F. Slagle, Menlo Park, CA (US)

(73) Assignee: Foveon, Inc., Santa Clara, CA (US)

( * ) Notice: Subject to any disclaimer, the term of this patent is extended or adjusted under 35 U.S.C. 154(b) by 17 days.

(21) Appl. No.: 10/001,354

(22) Filed: Oct. 30, 2001

(51) Int. Cl.[7] .............................. G02B 2/04; H04N 9/07; G03B 17/00
(52) U.S. Cl. ...................... 359/793; 359/795; 348/337; 396/71
(58) Field of Search ................................ 359/366, 637, 359/618, 672, 692, 793, 795; 348/335, 337; 396/71

(56) References Cited

U.S. PATENT DOCUMENTS

| | | | | |
|---|---|---|---|---|
| 4,009,942 A | * | 3/1977 | Hirose | 359/629 |
| 4,444,472 A | | 4/1984 | Tanaka | 350/423 |
| 5,140,462 A | * | 8/1992 | Kitagishi | 359/554 |
| 5,602,682 A | * | 2/1997 | Ito et al. | 359/672 |
| 5,721,994 A | * | 2/1998 | Ogata et al. | 396/317 |
| 5,726,809 A | * | 3/1998 | Griffith | 359/675 |
| 6,043,938 A | | 3/2000 | Ogasawara | 359/652 |
| 6,058,269 A | * | 5/2000 | Tsutsumi | 396/71 |
| 6,078,429 A | | 6/2000 | Lyon | 359/634 |
| 6,137,638 A | | 10/2000 | Yamagishi et al. | 359/682 |
| 6,157,781 A | * | 12/2000 | Konno et al. | 396/71 |

FOREIGN PATENT DOCUMENTS

JP  361027516 A  * 2/1986  ............ G02B/7/11

* cited by examiner

Primary Examiner—Georgia Epps
Assistant Examiner—Alicia M. Harrington
(74) Attorney, Agent, or Firm—Sierra Patent Group, Ltd.

(57) ABSTRACT

A corrector optic is provided, for use in a camera system that includes a thick prism in front of the focal plane. The corrector optic includes preferably two lenses to be aligned on the optical axis of the camera system. When coupled within the camera system, the corrector optic is disposed between the objective lens and the prism. A preferred corrector optic includes a positive lens having a convex surface facing the objective lens and a negative lens having a concave surface facing the prism, such that the lenses together reduce spherical and coma aberrations caused by imaging through the prism. Chromatic aberration is also reduced by choosing the negative lens material to have a higher index of refraction and higher dispersion than those of the positive lens material.

21 Claims, 7 Drawing Sheets

CORRECTOR OPTIC COMPENSATING SPHERICAL AND COMA ABERRATIONS GENERATED BY A PRISM

BACKGROUND OF THE INVENTION

1. Field of the Invention

The invention relates to a camera that uses an objective lens through a thick prism, and particularly to a camera that has a thick prism and a corrector optic for reduction of image defects and restoration of image quality.

2. Discussion of the Related Art

A conventional camera that uses an objective lens in combination with a thick color-separation prism, where the objective-lens was designed for imaging through air, typically creates images that have quality detriments due to aberrations caused by the prism. A digital camera that uses three imagers for three color channels may use such a lens and prism for imaging, and thus may be subject to such image degradation. It is possible, as known in the prior art, to design lenses specifically to work through such a prism, such that the overall optical system of lens plus prism has sufficient image quality. That approach, however, does not allow a camera user or manufacturer to select from the wide range of commercially available, standard, removable lenses. Thus, it is desirable to provide, for a camera that uses conventional commercial camera lenses and a thick color-separation or beam-splitting prism, a means for restoring image.

SUMMARY OF THE INVENTION

A corrector optic is provided to be optically disposed between a prism and an objective lens of a camera, to improve the quality of images that are created by operation of the objective lens through the prism. A camera and an optical module are each provided; each includes a corrector optic comprising at least two lenses for compensating aberrations generated by the prism.

In further aspects of the invention, the corrector optic includes separate positive and negative lenses, for jointly correcting spherical and coma aberrations generated by the prism; the first lens is a positive lens having convex surface toward the objective lens, and the second is a negative lens having a concave surface toward the prism. The prism may be a thick color-separation prism or a beam-splitter prism. A corrector-optic module may be configured to mount to an objective-lens assembly and to a prism module, or the corrector optic may be contained within the prism module.

DETAILED DESCRIPTION OF THE PREFERRED EMBODIMENTS

Figure 1:
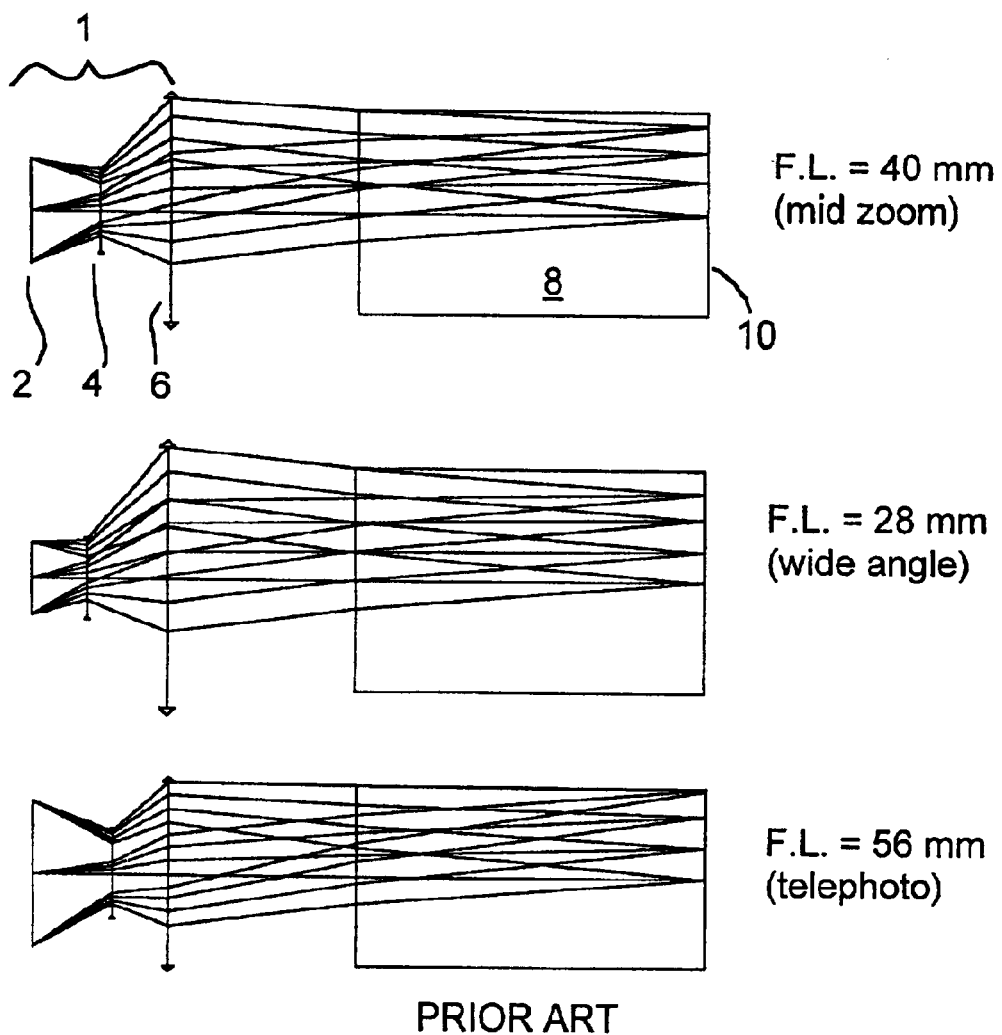
FIG. 1 schematically illustrates a prior-art optical design of a camera that has an objective lens and a thick prism, the objective lens being modeled as a three-element paraxial zoom lens and being shown in three configurations.

Referring to FIG. 1, a lens 1 for a prior-art optical system includes multiple elements, such as the three idealized optical elements 2, 4, and 6 shown in that figure. The camera of FIG. 1 further includes a thick prism 8. The "ideal" lens model results in no image defect when it is imaging through air, rather than through a prism. That is, using an "ideal" lens in the optical system model will isolate those image defects that arise from use of a thick prism 8 from any defects that might arise from use of a real lens. The prior art system is illustrated for three configurations of the zoom lens, with effective focal lengths 40 mm, 28 mm, and 56 mm, as noted in FIG. 1.

It is desired, according to a preferred embodiment herein, to provide a high-performance professional camera that will work with a variety of high-quality, commercially available lenses, and that incorporates a corrector, designed to work with "ideal" lenses, that will allow many lenses to produce images that have greatly reduced prism-related defects. Many desirable cameras may be achieved according to the preferred embodiments herein, and any of them may use any of a wide variety of objective lenses that may be presently available, or that may be developed in the future.

A paraxial, or ideal, zoom-lens design may include three elements 2, 4, and 6, as shown schematically in FIG. 1. Such a lens design would be used for producing an image at an image plane 10. If the prism 8 is used for color separation, then there may be more than one (for example, three) image planes, corresponding to the multiple separated colors. An image detector (not shown), such as an array detector, may be positioned at each image plane, regardless of whether there are one or more image planes.

The most prominent aberrations contributed by the thick prism are spherical and coma, as is known in the art. The magnitude of coma aberration depends on the chief ray angle at the entry face of the prism. For any particular location in the image plane, the chief ray angle decreases as the exit pupil moves farther from the focal plane. In the example three-element zoom lens 1 shown in FIG. 1, the exit-pupil position is not controlled. In particular, the exit pupil is closest for the longest focal settings, causing the largest coma errors for the longer focal length configurations. It is recognized that a corrector optic optimized for a particular exit-pupil distance or zoom position may provide only a partial correction, or an over-correction, for other positions and for other lenses.

Figure 2:
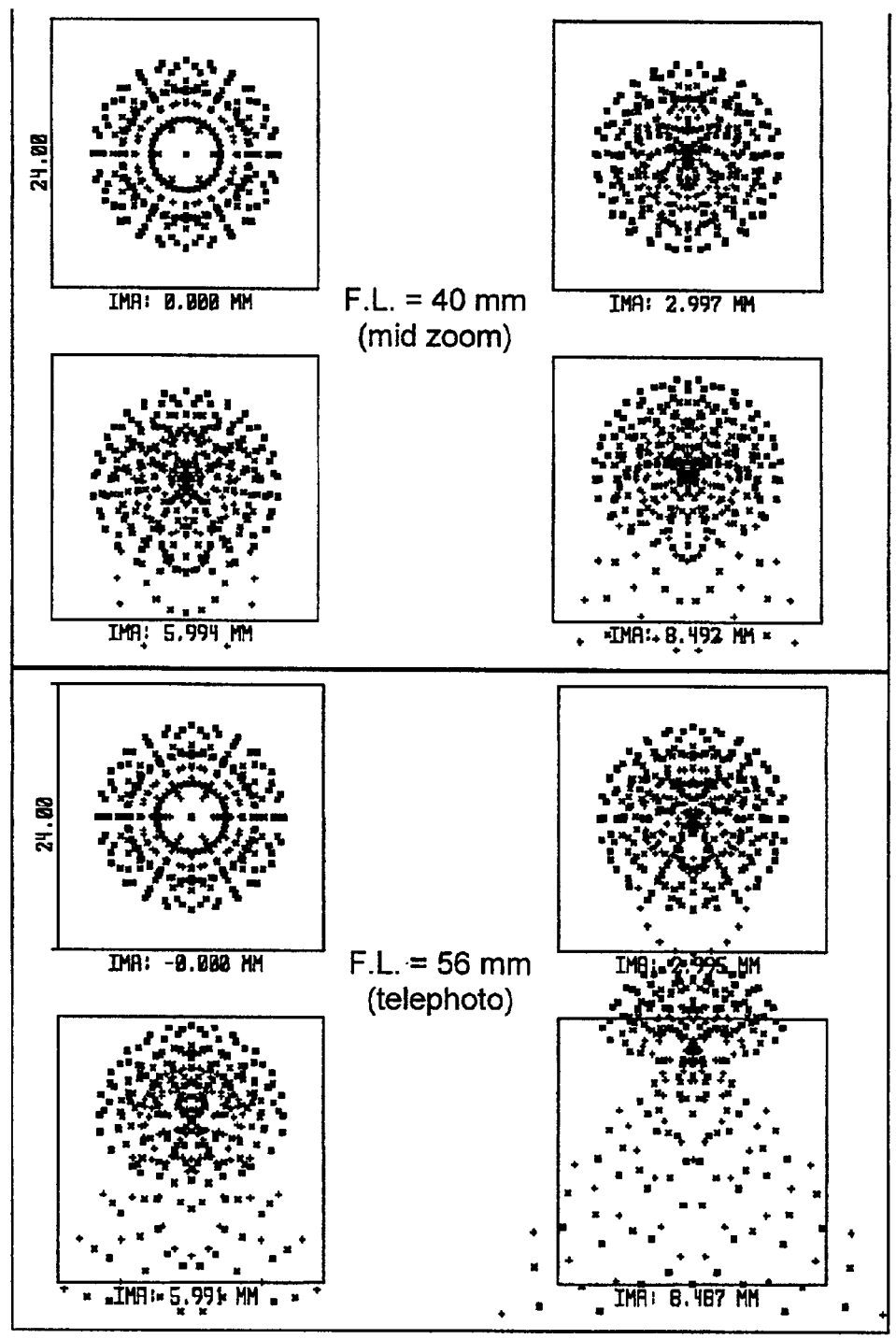
FIG. 2 shows spot diagrams for the camera of FIG. 1 for the two worst zoom configurations.

The degree of image degradation of an imaging-system design can be expressed through a spot diagram or through a modulation-transfer-function (MTF) plot. The "ynu" diagram, or side view of the lens shown schematically in FIG. 1, is useful for general understanding of the configuration. A spot diagram, such as the one shown in FIG. 2, is useful in depicting image blur, or crosstalk among pixels, that is generated by aberrations. MTF plots, such as those shown in FIG. 3, describe system performance in the spatial-frequency domain. The ideal response (for example, achieved in the absence of the thick prism 8, and using the ideal lens of FIG. 1) is a spot diagram of zero diameter, and a diffraction-limited MTF (following the upper curve in the MTF diagram, the diffraction-limit curve).

For definiteness in this discussion, embodiments of the present invention may be used in a camera such as the Foveon II camera, which is manufactured and sold by Foveon, Inc., of Santa Clara, Calif. In the Foveon II camera, a color-separation prism is used with three CMOS imager chips. Each imager chip has an array of 2048 by 2048 pixel sensors, with each pixel sensor being a 6-micron square and the overall format being a 12-mm square (dimensions are approximate). Therefore, spatial frequencies up to $1/(2*0.006)=83$ line pairs per mm (lp/mm), also known as cycles per mm, can potentially be resolved and represented in the sampled image. An ideal optical system would have a good MTF, near the diffraction limit, up to frequencies near 83 lp/mm, and a very low MTF thereafter.

The example camera accepts a new family of lenses that may be designed to operate through a prism. With an adapter, it also accepts lenses that fit the Canon EOS mount, which allows 44 mm of working distance between the EOS-mount flange and the focal plane when working through air. According to the present invention, the EOS-mount lens adapter can include a corrector optic to allow the family of EOS-mount lenses to produce sharper images, thereby giving the user a much wider lens choice than just the new family of lenses. The color-separation prism is about 33 mm thick, displacing an equivalent air path length of about 22 mm, leaving another nearly 22 mm of path for other optics, such as an infrared-blocking filter, a quarter-wave plate to reduce color dependence on light polarization, and a corrector optic. The 33 mm prism thickness is used in the example optical-system configurations that illustrate the invention herein. The EOS-mount lenses have been found experimentally to have exit pupils between 50 mm and 150 mm from the focal plane (in air), with 70 mm being typical. The exit-pupil distance determines the point on the optical axis from which chief rays to different points in the image plane diverge, and is therefore an important optical property that affects the design of the optimum corrector for such lenses. The analyzed ideal zoom lens 1 of FIG. 1 has an exit pupil, in air, that moves from approximately 72 mm, for the telephoto end of the zoom range, through 120 mm at mid zoom, to 362 mm for the wide end of the zoom range, so it is not the best model lens to optimize the corrector for, but provides a useful design study example.

Figure 3:
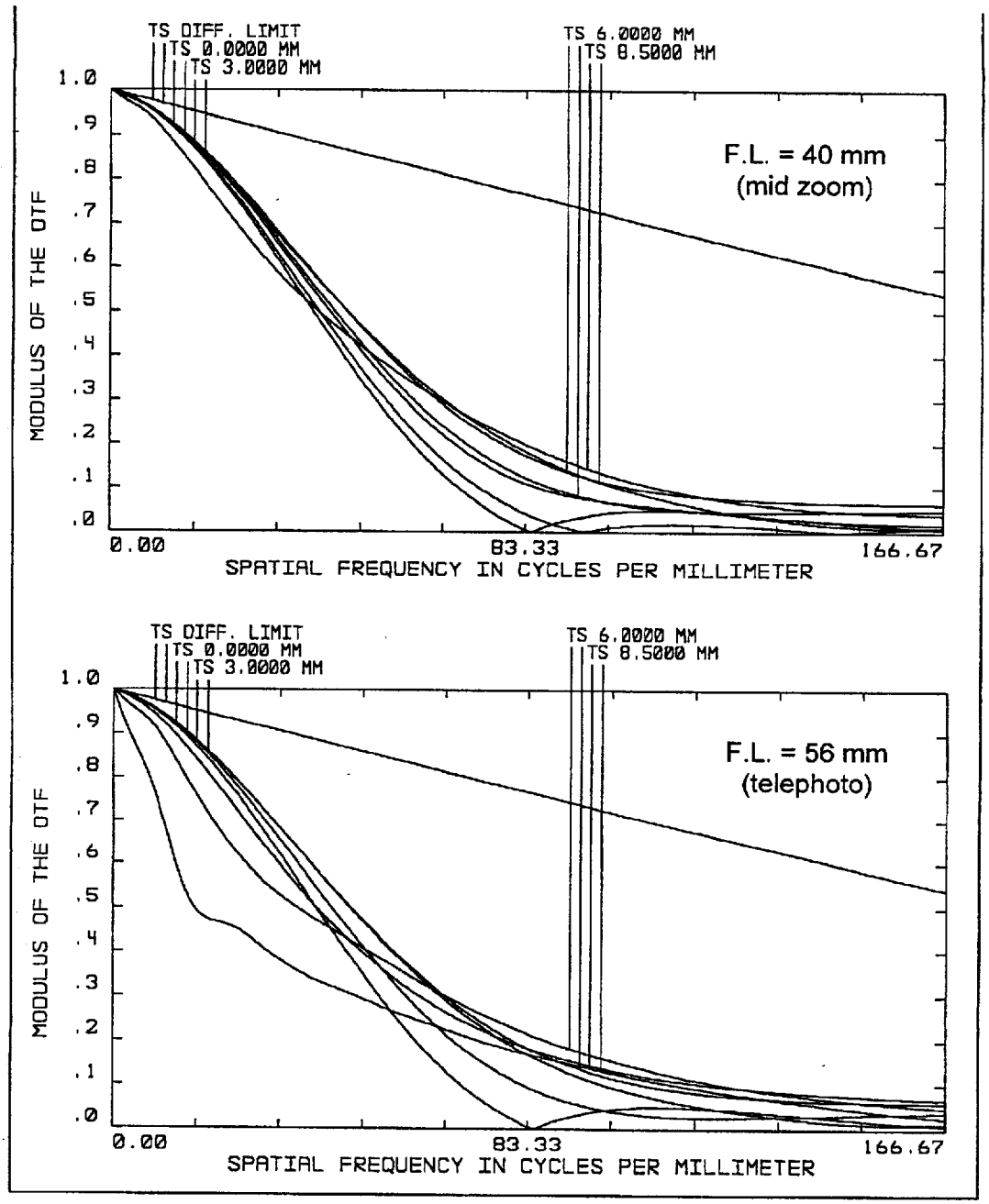
FIG. 3 shows transfer functions for the camera of FIG. 1, for the two worst zoom configurations.

The performance of the lens 1 of FIG. 1, with the thick prism 8 inserted as drawn in that figure, is shown in FIGS. 2, and 3. The configurations considered in these analyses are combinations of effective focal length (efl)=(28 mm, 40 mm, and 56 mm) and wavelength =(510 nm, 540 nm, and 580 nm, representing a green color channel). The spot diagrams of FIG. 2 and the MTF plots of FIG. 3 indicate the system performance for selected focal lengths, with all three wavelengths present at once in each case. Note that the MTF is greatly reduced from the ideal diffraction limit in all cases. The contrast falls quickly to a cutoff around 90 cycles per mm. This MTF reduction indicates that a significant reduction in contrast will occur at the highest spatial frequencies seen by the imager (up to 83 lp/mm).

In the spot diagrams and MTF diagrams, performance is evaluated at four locations in the image plain, indicated by the "image height" parameter values of 0 (center), 3 mm (half way to edge), 6 mm (edge of 12 mm square field), and 8.5 mm (corner of field); due to rounding errors in the software, the labeled image height values in the spot diagrams are not exact. The MTF curves are further labeled "T" and "S" for tangential and sagittal contrast directions, as is known in the art.

A different perspective on system performance is presented by the spot diagrams of FIG. 2. The scale of the boxes shown is 24 microns, significantly larger than the 6-micron pixel sensor of the example Foveon II camera. The coma error causes the offset of the energy centroid from the chief ray; the coma is evident in the asymmetric spot pattern seen in the furthest off-axis locations (that is, in the lower spot patterns for each focal length).

It is preferred herein to use a corrector optic with at least two elements for correcting aberrations caused by the thick prism, such as particularly the spherical and coma aberrations as described above. Attempts to achieve significant correction with a single element have not been successful.

Figure 4:
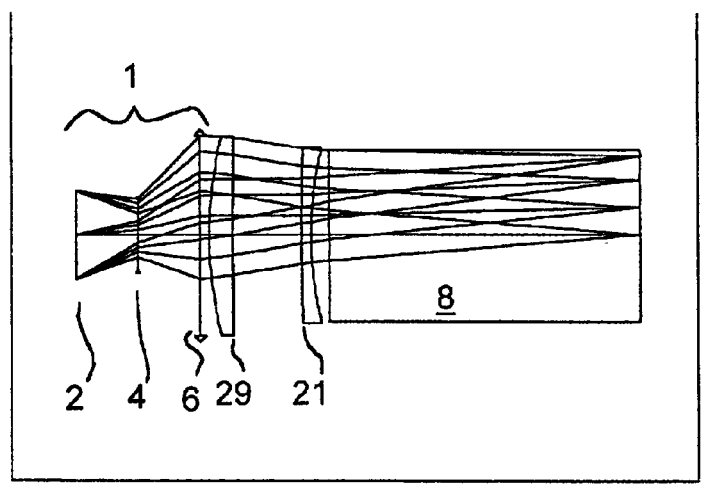
FIG. 4 schematically illustrates an optical design of a camera that has a lens and a thick prism, and that incorporates a two-element corrector optic according to a preferred embodiment; only the mid-zoom configuration is shown.

The preferred position for correction is between the lens 1 and the prism 8 of FIG. 1. Referring now to FIG. 4, a two-element corrector optic using positive lens 29 and negative lens 21 is shown disposed between the lens 1 and the prism 8, each of these components being otherwise as already described above in reference to FIG. 1. It is noted here that any of a variety of objective lenses 1 may be substituted for the zoom lens with elements 2, 4, and 6, including various objective lenses 1 that have no zoom features. The camera designs shown in FIGS. 8, 9, and 10 and described below could similarly use any of a variety of objective lenses 1 and still could benefit from use of the corrector optics shown.

Figure 5:
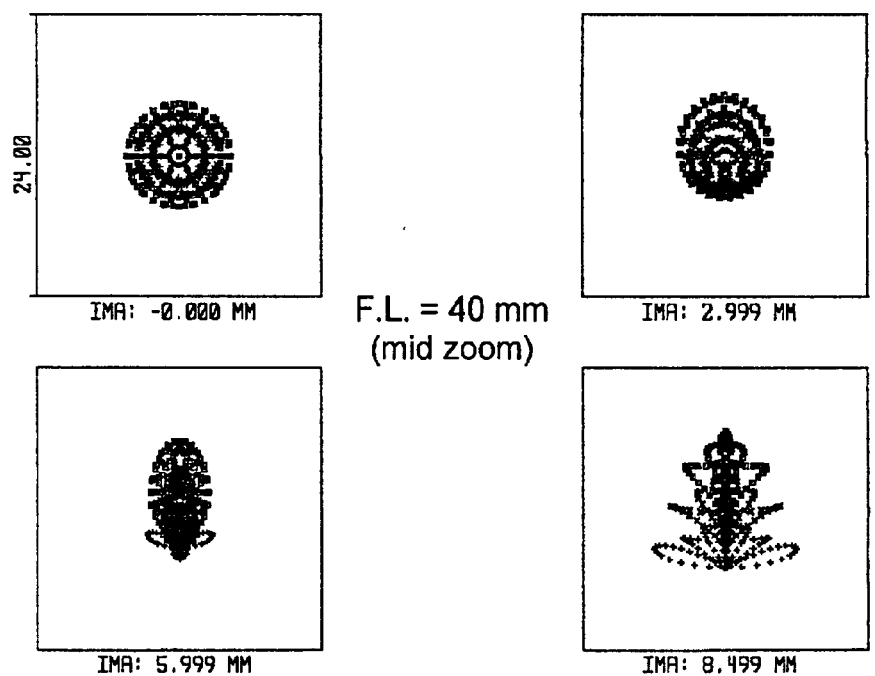
FIG. 5 shows spot diagrams for the camera of FIG. 4, at mid zoom
Figure 6:
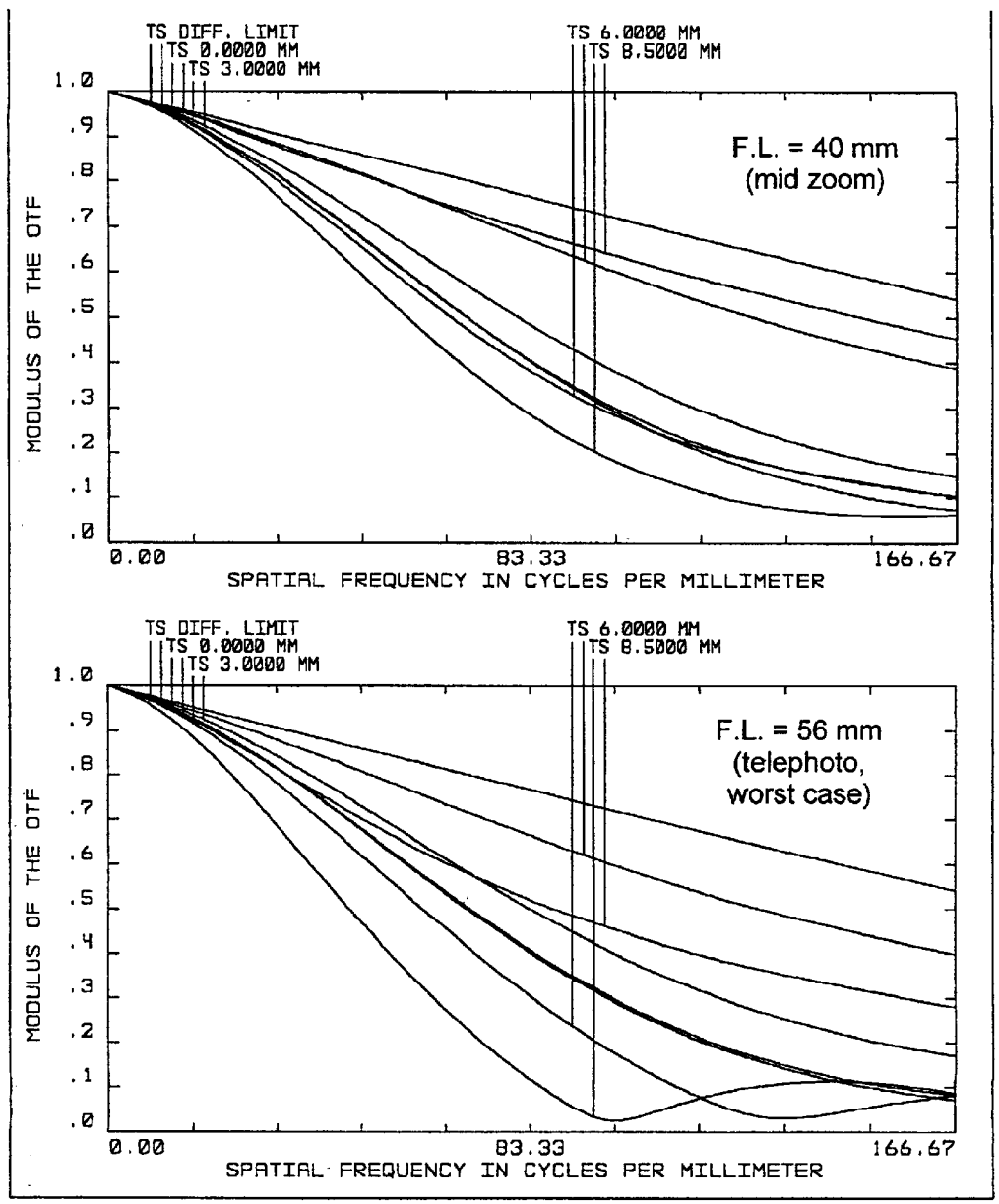
FIG. 6 shows transfer functions for the camera of FIG. 4, for the two worst zoom configurations.

For the camera of FIG. 4 at mid-zoom, FIG. 5 shows spot diagrams, and FIG. 6 shows MTF plots; the advantages in system performance are clearly observable. FIG. 5 shows distinctly smaller spots than FIG. 2 for the mid-zoom configuration. The MTF shown in FIG. 6 is raised to above 25% at the Nyquist frequency (83 lp/mm) for the mid-zoom configuration (and for the wide-angle configuration, not shown), and above 25% for the telephoto configuration except in the corner of the image field. By contrast, the uncorrected prior-art system shows an MTF below 25% at Nyquist frequency for all positions and all configurations, as can be seen in FIG. 3. The plotted MTF results are all for f/4; at f/5.6 and higher f-numbers, the system approaches closer to diffraction-limited response, while at f/2.8 and lower f-numbers, the system still has considerable aberrations.

The optimized corrector optic in FIG. 4 is an air-spaced doublet that comprises elements 21 and 29. The position of the image plane is changed somewhat as compared to that in the uncorrected system of FIG. 1. The slightly reduced distance from the objective lens to the prism results in a somewhat shortened effective focal length, which can be an advantage in a camera such as the Foveon II that uses a small-format sensor with lenses designed for a larger format. The effective focal lengths for the configurations being considered are approximately 25, 36, and 50 mm, or about 10% less than the focal lengths in air of the same objective lens. Thus the field of view of the camera has been increased by about 10% by the corrector, which is a further advantage.

The air-spaced doublet uses a low-dispersion positive lens 29, preferably formed of fused silica (index 1.49, Abbe number 67.8), and a slightly higher-index higher-dispersion (lower Abbe number) negative lens 21, preferably formed of Schott BK7 glass (index 1.52, Abbe number 64.2). This combination of dispersions advantageously minimizes chromatic effects. Manufacturing concerns may dictate the final choice of lens materials and the limitation of the extent of the air space. As both elements 21 and 29 are spherical and are shown as readily available glass types, this design is further advantageous in that it is relatively simple to prototype. More complex correctors with additional elements and/or aspherical surfaces are also anticipated.

The two-element optical corrector comprising elements 21 and 29 is about 14 mm long, including an air space of 1 mm at each end. This estimated length is illustrative only, as the corrector-optic elements 21, 29 may be redesigned for a particular camera configuration. For these illustrative designs, the prism is assumed to be made of Schott BK7 glass.

An effect which will be among the remaining defects after partial correction of spherical and coma aberrations is the chromatic aberration; in the drawings, three wavelengths of 510, 540, and 570 nm are taken to represent the approximate distribution of wavelengths in a green color channel; the green channel is the most important for luminance sharpness. Across this wavelength range, there is a lateral chromatic spread, in the corner of the field, of almost 12 microns, or substantially more than the size of a pixel. Chromatic differences between the color channels in the example camera are less important, as the imagers can be adjusted for simultaneous focus, and the images can be combined using a fine-alignment distortion operation to take out between-channel lateral effects.

For cameras with all wavelengths going to a single image plane, it is anticipated that a better corrector will be designed with different material types and/or additional elements, such that additional degrees of freedom can be utilized to better correct for chromatic aberration as well. A further reduction of chromatic aberration effects, and a corresponding further improvement in system sharpness, can be obtained by using higher-dispersion glasses. For example, using glass F9 (index 1.62, Abbe number 38.1) for the positive element, and glass LASF35 (index 2.02, Abbe number 29.1) for negative element, yields a considerable improvement. Other effective combinations of materials are Acrylic (index 1.49, Abbe number 55.3) or Schott K10 (index 1.50, Abbe number 56.4) for the positive lens, and Schott BASF51 (index 172, Abbe number 38.1) or Schott BAF51 (index 1.65, Abbe number 44.9) for the negative lens.

The corrector represented in FIGS. 4 through 6 is specified by the materials, thicknesses, and curvatures shown in Table 1. In Table 1, lines 1 through 5 represent the model zooms lens 1 at mid zoom. Lines 6 through 11 represent the corrector, including air spaces before and after it. Lines 12 and 13 represent the prism with image plane at the exit face. Notice that the curvatures listed are in units of reciprocal mm, so the surface radii at lines 7 and 11 are approximately 43 mm and 38 mm, respectively, while other aces are more nearly plane.

TABLE 1

| # | Type | Curvature | Thickness | Glass/F.L. | comment |
|---|------|-----------|-----------|------------|---------|
| 1 | PARAXIAL | 0.0000000 | 0.0000000 | F.L. 13.3 | |
| 2 | STANDARD | 0.0000000 | 6.6500000 | | |

TABLE 1-continued

| # | Type | Curvature | Thickness | Glass/F.L. | comment |
|---|------|-----------|-----------|------------|---------|
| 3 | PARAXIAL | 0.0000000 | 0.0000000 | F.L. −3.325 | |
| 4 | STANDARD | 0.0000000 | 6.6500000 | | |
| 5 | PARAXIAL | 0.0000000 | 0.0000000 | F.L. 9.975 | |
| 6 | STANDARD | 0.0000000 | 1.0000000 | | |
| 7 | STANDARD | 0.0235380 | 2.5000000 | SILICA | positive lens |
| 8 | STANDARD | 0.0028583 | 0.0000000 | | |
| 9 | STANDARD | 0.0000000 | 7.5000000 | | |
| 10 | STANDARD | 0.0021720 | 1.0000000 | BK7 | negative lens |
| 11 | STANDARD | 0.0265643 | 2.0000000 | | |
| 12 | STANDARD | 0.0000000 | 33.400000 | BK7 | prism |
| 13 | STANDARD | 0.0000000 | 0.0000000 | | image |

Table 2 shows another corrector design that was re-optimized for a set of ideal fixed (non zoom) lenses of focal lengths 50 mm, 70 mm, and 100 mm, with exit pupils at distances 50 mm 70 mm, and 100 mm from the focal plane in air, respectively. In Table 2, lines 1 through 2 represent the model ideal lens (100 mm shown). Lines 3 through 7 represent the corrector. Lines 8 and 9 represent the prism with image plane at the exit face.

TABLE 2

| # | Type | Curvature | Thickness | Glass | |
|---|------|-----------|-----------|-------|---|
| 1 | PARAXIAL | 0.0000000 | 0.0000000 | | ideal fixed lens |
| 2 | STANDARD | 0.0000000 | 60.000000 | | |
| 3 | STANDARD | 0.0253800 | 2.5000000 | SILICA | positive lens |
| 4 | STANDARD | 0.0004408 | 0.0000000 | | |
| 5 | STANDARD | 0.0000000 | 7.5000000 | | |
| 6 | STANDARD | −0.0015076 | 1.0000000 | BK7 | negative lens |
| 7 | STANDARD | 0.0278552 | 2.0000000 | | |
| 8 | STANDARD | 0.0000000 | 33.400000 | BK7 | prism |
| 9 | STANDARD | 0.0000000 | 0.0000000 | | image |

It can be observed that the two corrector designs, optimized for different ideal lenses, are not very different, and that several of the lens element surfaces are nearly plane. Constraining the back surface of the front element 29 and the front surface of the back element 21 to be plane, and reoptimizing, produces a corrector design very nearly as good as the design shown; such a design might be less costly to produce. For use with lenses that might have an exit pupil as close as 50 mm to the focal plane, the corrector of Table 2 is significantly superior, since it was optimized with the 50 mm condition included; for use with lenses having further exit pupils, the corrector of Table 1 is more nearly optimal. For any set of conditions of use, an optimum design can be found using an optics design optimization software package such as ZEMAX.

Figure 7:
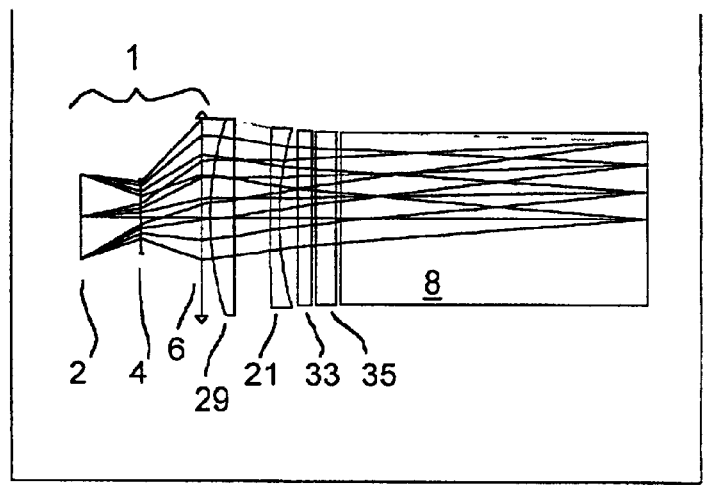
FIG. 7 schematically illustrates an optical design of a camera that has a lens and a thick prism and additional piano optics, and that incorporates a corrector optic according to a second preferred embodiment.

FIG. 7 shows schematically an optical configuration that includes additional optical elements that a typical camera system might require. In the preferred camera configuration of FIG. 7, the corrector-optic elements 21 and 29, lens 1, and thick prism 8 of FIG. 4 are used; in addition, plano optics elements 33 and 35 are included. These piano elements 33 and 35 are respectively an infrared-rejecting filter and a quarter-wave plate. The elements shown are a 1.25-mm-thick BG40 infrared-absorbing filter 33 and a 2.2-mm-thick quarter-wave plate 35. For the purposes of analysis, these optics may be modeled simply as solid glass elements of the same BK7 glass as the prism. The corrector elements and the added piano optics may be placed in orders other than that shown in FIG. 7; for example, the piano elements could be arranged between the corrector elements. In this preferred embodiment, the plano elements 33 and 35 may be bonded together, or may alternatively be separated as shown. The piano elements 33 and 35 also may be bonded to the prism 8, or alternatively may be separated from the prism 8 as shown in FIG. 7. Separation from the prism is required in configurations in which the front surface of the prism 8 represents the front of a color-separation prism with total internal reflection at the front face. The configurations shown may or may not reflect the best placement in terms of overall aberration-correction performance for the piano elements 33 and 35; those of ordinary skill in the art of optical-system optimization will understand that the corrector can be designed for different placements of the piano optics.

The performance of the optical configuration of FIG. 7, including the re-optimized corrector and glass path, is almost as good as the performance of the configuration of FIG. 4, in spite of the reduced element separation.

A preferred low-cost corrector optic for the example camera is formed by further constraining the elements 29 and 21 of FIG. 7 to each have one plane surface and one spherical surface, as discussed above. The resulting final design, optimized over the two zoom configurations with closer exit pupils, but not the for wide-angle configuration with the farthest exit pupil, is shown in Table 3 (in this table, the zoom lens is shown in its telephoto configuration). This design corrects aberrations almost as well as the other designs, except in the extreme corner of the field.

TABLE 3

| # | Type | Curvature | Thickness | Glass/F.L. | comment |
|---|---|---|---|---|---|
| 1 | PARAXIAL | 0.0000000 | 0.0000000 | F.L. 13.3 | |
| 2 | STANDARD | 0.0000000 | 7.6059375 | | |
| 3 | PARAXIAL | 0.0000000 | 0.0000000 | F.L. −3.325 | |
| 4 | STANDARD | 0.0000000 | 5.3083333 | | |
| 5 | PARAXIAL | 0.0000000 | 0.0000000 | F.L. 9.975 | |
| 6 | STANDARD | 0.0000000 | 1.0000000 | | |
| 7 | STANDARD | 0.0259147 | 2.5000000 | SILICA | positive lens |
| 8 | STANDARD | 0.0000000 | 0.0000000 | | |
| 9 | STANDARD | 0.0000000 | 4.0000000 | | |
| 10 | STANDARD | 0.0000000 | 1.0000000 | BK7 | negative lens |
| 11 | STANDARD | 0.0248930 | 2.0000000 | | |
| 12 | STANDARD | 0.0000000 | 1.5000000 | BK7 | IR filter |
| 13 | STANDARD | 0.0000000 | 0.5000000 | | |
| 14 | STANDARD | 0.0000000 | 2.2000000 | BK7 | QWP |
| 15 | STANDARD | 0.0000000 | 0.5000000 | | |
| 16 | STANDARD | 0.0000000 | 33.400000 | BK7 | prism |
| 17 | STANDARD | 0.0000000 | 0.0000000 | | image |

Figure 8:
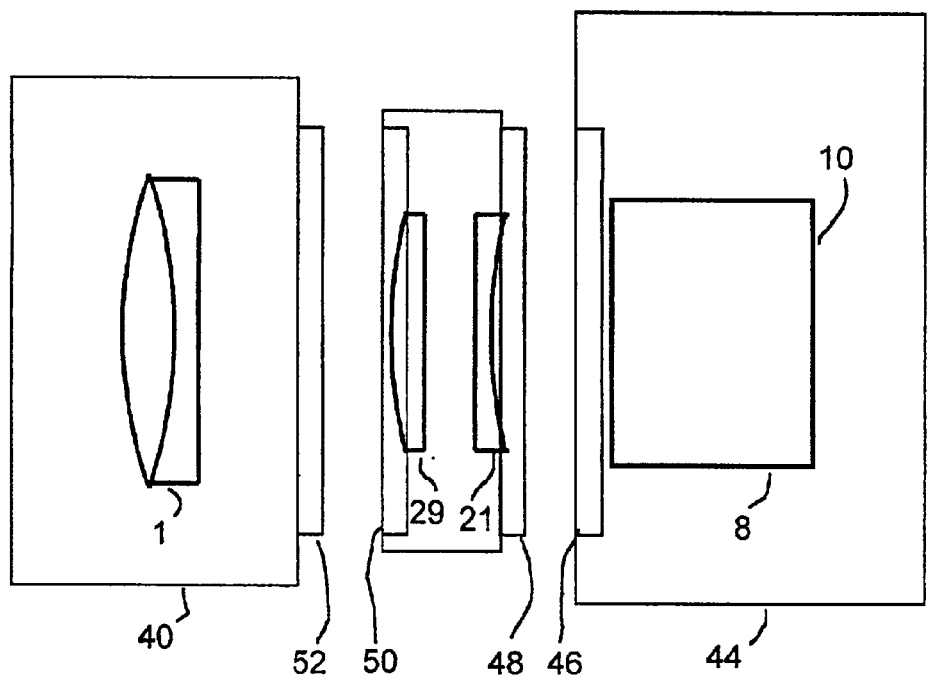
FIG. 8 schematically illustrates an add-on adapter arrangement for mounting a corrector optic between an objective lens and a thick prism.

FIG. 8 illustrates schematically an add-on adapter arrangement for mounting the corrector optic of any of the above-described optical embodiments, including preferably the two elements 21 and 29, between objective lens 1 and thick prism 8. As shown in FIG. 8, the lens 1 is disposed in an objective housing 40. The corrector optic is disposed in a corrector-optic adapter housing 42. The prism 8 is disposed in a main camera housing 44, wherein one or more image planes 10 would each preferably have a detector positioned for detecting the image or images projected there. Other components of the camera that are not shown, and variations thereof, will be understood by those skilled in the art of camera design.

The main camera housing 44 is shown in FIG. 8 as having a slot 46 for receiving a coupling portion 48 of the corrector-optic adapter housing 42. The coupling portion 48 of the main camera housing 44 is preferably a male complement of the slot 46, but these coupling complements 46 and 48 also may be oppositely configured. The corrector-optic adapter housing 42 has a slot 50 for coupling with a coupling portion 52 of the objective housing 40. Preferably, the coupling portion 52 is configured to couple with slot 50 using dimensions and other specifications that are standard or are already in use, so that the corrector-optic adapter housing 42 may accept any of an existing family of objective lenses.

Figure 9:
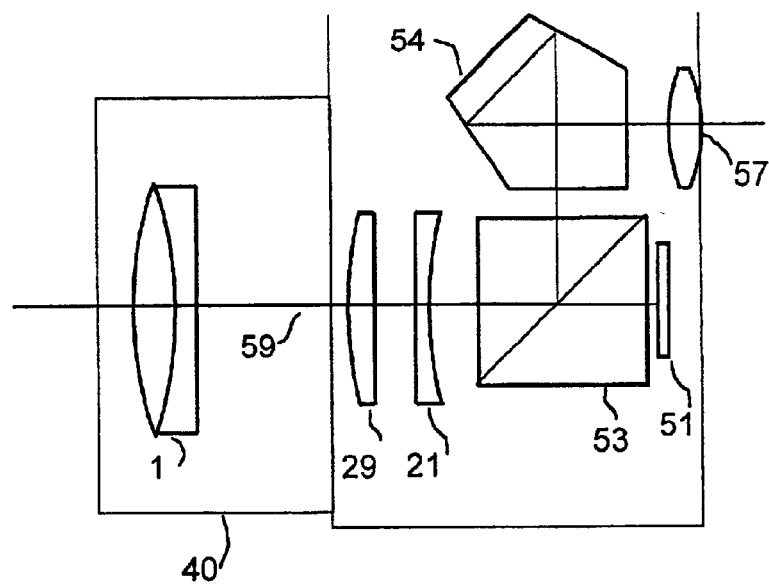
FIG. 9 schematically illustrates a single-lens-reflex camera arrangement that includes a lens, a corrector optic, and a beam-splitter cube, wherein one beam portion is incident at an imager and another is used with a viewfinder.

FIG. 9 schematically illustrates a configuration of a single-lens-reflex camera that has a lens 1 disposed within an objective housing 40, which is coupled or mounted to a camera housing 58. The camera housing 58 contains a beam-splitter prism 53 disposed between imager 51 and corrector-optics elements 21 and 29. Beam-splitter prism 53 is one embodiment of the more general thick prism 8. Incoming light 59, after traversing objective lens 1 and corrector-optics elements 21 and 29, is split into two beam portions; a first beam portion is incident at the imager 51, and a second beam portion is incident at a viewfinder 57. A prism 54 for redirecting the second portion of the beam toward the viewfinder 57 is also shown within the camera housing 58. Imager 51 may be a color imager capable of sensing three colors.

Figure 10:
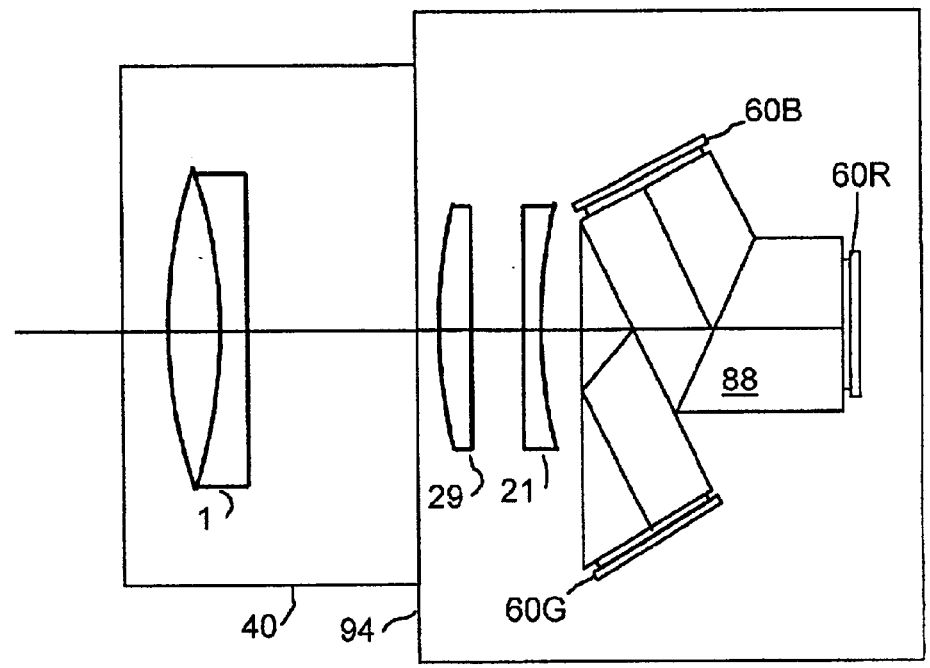
FIG. 10 schematically illustrates a camera arrangement that includes a color-separation prism and three electronic imagers.

FIG. 10 illustrates in schematic form an electronic camera according to a preferred embodiment. Color-separating prism 88, one possible embodiment of the more general thick prism 8, is shown mounted inside light-tight camera housing 94. Lens 1, within objective housing 40, is coupled to the camera housing 94, which contains the corrector-optic elements 21 and 29. The camera is configured such that an image is projected through the input face of the prism 88, and is thereby split into red, green, and blue images, each of which is focused on one of output faces of prism 88. Attached to the three output faces are three imagers mounted on chip-on-board assemblies 60R, 60G, and 60B, aligned such that the color-separated images fall on the active areas of the respective imagers in registration.

The invention is useful with still cameras, video cameras, and hybrids thereof, and with other more specialized types of cameras.

The corrector optic of the present invention can be designed and optimized for a variety of cameras, for a variety of lenses, and to meet a variety of optimization criteria and mechanical and cost constraints. It is expected that many variations of the inventive corrector will be developed for a range of applications. A beneficial property of the invention described, when it is used with electronic imagers, is that the corrector design is robust to small variations, such that a corrector optimized for one lens but operated with another lens will still typically yield an image sharpness significantly improved over the sharpness of the prior-art system without the corrector.

Although exemplary drawings and specific embodiments of the present invention have been described and illustrated here, it is to be understood that the scope of the present invention is not to be limited to the particular embodiments discussed. Thus, the embodiments shall be regarded as illustrative, rather than as restrictive, and it should be understood that variations may be made in those embodiments by workers skilled in the relevant arts, without departing from the scope of the present invention as set forth in the claims that follow, and in equivalents thereof.

What is claimed is:

1. A corrector optic for being optically disposed between a prism and an objective lens of a camera, comprising at least two lenses for compensating spherical and coma aberrations generated by the prism.

2. The corrector optic of claim 1, wherein the at least two lenses comprise:

a positive lens for being disposed between the objective lens and the prism and having a convex surface for being disposed toward the objective lens; and a negative lens for being disposed between the positive lens and the prism and having a concave surface for being disposed toward the prism.

3. The corrector optic of claim 2 wherein the positive lens is formed of a first material having a first index of refraction and a first Abbe number, and the negative lens is formed of a second material having a second index of refraction and a second Abbe number, said second index of refraction being higher than said first index of refraction, and said second Abbe number being lower than said first Abbe number.

4. A camera for coupling with an objective lens comprising:

a prism for being disposed between the objective lens and an image plane, said prism generating aberrations; and a corrector optic for being disposed between the objective lens and the prism, said corrector optic comprising at least two lenses for compensating spherical and coma aberrations generated by the prism.

5. The camera of claim 4, wherein the at least two lenses comprise:

a positive lens for being disposed between the objective lens and the prism and having a convex surface for being disposed toward the objective lens; and a negative lens for being disposed between the positive lens and the prism and having a concave surface for being disposed toward the prism.

6. The camera of claim 5 further comprising an infrared-rejecting filter disposed between the objective lens and the prism.

7. The camera of claim 6 wherein the infrared-rejecting filter is disposed between the corrector optic and the prism.

8. The camera of claim 5 wherein the prism is a color-separation prism.

9. The camera of claim 8 further comprising a quarter-wave plate disposed between the objective lens and the prism.

10. The camera of claim 9 wherein the quarter-wave plate is disposed between the corrector optic and the prism.

11. The camera of claim 10 further comprising an infrared-rejecting filter disposed between the objective lens and the prism.

12. The camera of claim 11 wherein the infrared-rejecting filter is disposed between the corrector optic and the prism.

13. The camera of claim 5 wherein the positive lens is formed of a first material having a first index of refraction and a first Abbe number, and the negative lens is formed of a second material having a second index of refraction and a second Abbe number, said second index of refraction being higher than said first index of refraction, and said second Abbe number being lower than said first Abbe number.

14. A camera, comprising:

an objective lens;

a prism disposed between the objective lens and an image plane, said prism generating aberrations; and a corrector optic disposed between the objective lens and the prism, said corrector optic comprising at least two lenses for compensating spherical and coma aberrations generated by the prism.

15. The camera of claim 14, wherein the at least two lenses comprise:

a positive lens disposed between the objective lens and the prism and having a convex surface disposed toward the objective lens; and a negative lens disposed between the positive lens and the prism and having a concave surface disposed toward the prism.

16. The camera of claim 15 wherein the prism is a color-separation prism.

17. The camera of claim 15 wherein the prism is a viewfinder beam-splitter prism.

18. The camera of claim 15 wherein the positive lens is formed of a first material having a first index of refraction and a first Abbe number, and the negative lens is formed of a second material having a second index of refraction and a second Abbe number, said second index of refraction being higher than said first index of refraction, and said second Abbe number being lower than said first Abbe number.

19. A corrector-optic module for coupling between an objective lens and a prism module, comprising:

a corrector optic for compensating spherical and coma aberrations generated by the prism module;

a front mount for coupling with a mount of the objective lens; and a rear mount for coupling with a mount of the prism module.

20. The corrector-optic module of claim 19 wherein the corrector optic comprises a positive lens having a convex surface disposed toward said front mount and a negative lens having a concave surface disposed toward said rear mount.

21. The corrector-optic module of claim 20 wherein the positive lens is formed of a first material having a first index of refraction and a first Abbe number, and the negative lens is formed of a second material having a second index of refraction and a second Abbe number, said second index of refraction being higher than said first index of refraction, and said second Abbe number being lower than said first Abbe number.

* * * * *